Oct. 8, 1940.　　　　L. J. WHITE　　　　2,217,579
LIQUID LEVEL GAUGE UNIT
Filed Dec. 9, 1937
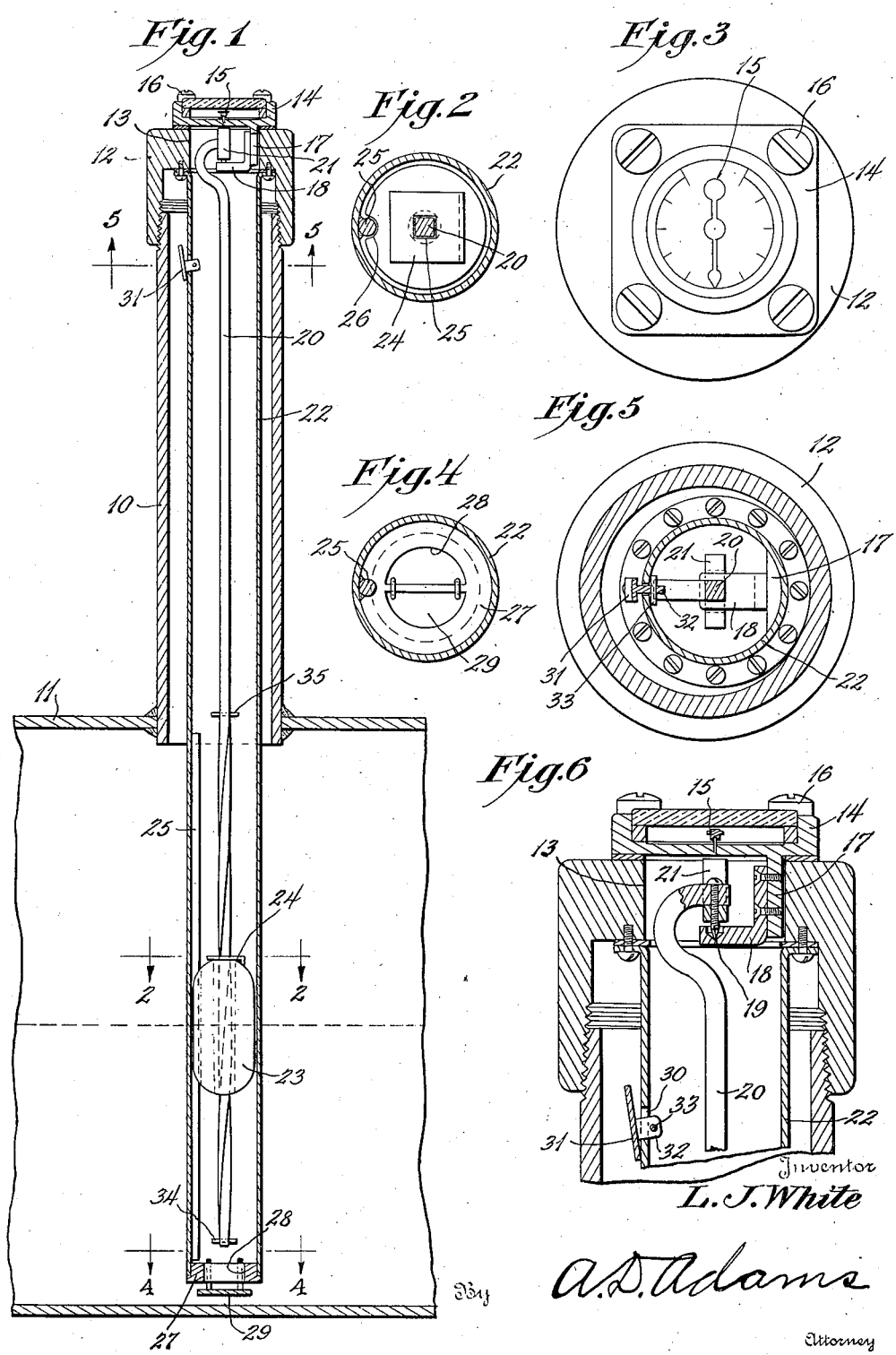

Patented Oct. 8, 1940

2,217,579

UNITED STATES PATENT OFFICE 2,217,579

LIQUID LEVEL GAUGE UNIT

Loyd J. White, San Antonio, Tex., assignor to Southern Steel Company, a corporation of Texas Application December 9, 1937, Serial No. 179,031

8 Claims. (Cl. 73—320)

This invention relates to liquefied petroleum gas storage and dispensing systems and, among other objects, aims to provide an improved liquid level gauge unit adapted to be assembled at the factory and shipped ready to be applied to a storage tank. Another aim of the invention is to provide a gauge and float assembly adapted to be removed from the tank without emptying the tank and having means to prevent the escape of the contents of the tank to the atmosphere. A further aim is to provide improved float operating mechanism for a liquid level gauge enclosed within a valved casing projecting into the tank. More specifically, the invention aims to provide a combined liquid level gauge and float operating means for the gauge adapted to be assembled on a standpipe connected to the tank. The main idea is to provide an appurtenance of this type for systems of the general type disclosed in my copending applications Ser. Nos. 169,699 filed October 18, 1937; 145,352 filed May 28, 1937; 98,048 filed August 26, 1936; 137,827 filed April 19, 1937 and Patent No. 2,042,439.

Other aims and advantages of the invention will appear in the specification, when considered in connection with the accompanying drawing, wherein:

Fig. 1 is a vertical sectional view showing the preferred embodiment of the invention applied to a storage tank;

Fig. 2 is an enlarged sectional view taken on the line 2—2 of Fig. 1;

Fig. 3 is an enlarged top plan view of the level gauge shown in Fig. 1;

Fig. 4 is an enlarged sectional view taken on the line 4—4 of Fig. 1;

Fig. 5 is an enlarged sectional view taken on the line 5—5 of Fig. 1; and

Fig. 6 is a fragmentary enlarged sectional view of the upper portion of Fig. 1.

Referring particularly to the drawing, the improved level gauge unit is shown as being applied to a storage and dispensing tank for liquefied petroleum gas. It is primarily contrived to be used as a separate appurtenance or unit from the usual dispensing and filling apparatus shown in the aforesaid copending applications and said patent. However, it is contemplated that it may be used in conjunction with the combination fittings such as are shown in my application Ser. No. 169,699.

In this example, a standpipe 10 is shown as being welded to the storage tank 11 and is screw threaded at its upper end to receive a fitting 12 carrying both the gauge and its associated mechanism as a complete assembled unit. The fitting has a vertical opening 13 and the housing 14 of an ordinary magnetic level gauge pointer 15 is secured to the upper face of the fitting by machine screws 16. The housing has an extension 17 projecting into the opening at one side and carrying a bearing bracket 18 on which is mounted a bearing screw or member 19 at the upper end of a gauge operating shaft 20 which is bent at its upper end adjacent to the bracket to provide clearance. The bearing screw 19 also carries an ordinary horseshoe magnet for operating the gauge pointer. However, it is to be understood that other types of gauge operating means may be employed.

The gauge operating shaft projects downwardly into the tank through the standpipe and is shown as being confined within a conduit or tubular casing 22 having a flanged upper end removably secured to the inside of the fitting 12 and extending to a point near the bottom of the tank. The shaft is shown as being operated by a float 23 also confined within the casing. In this example, the shaft is non-circular in cross section and is twisted at the lower end portion within the tank and projects through a cylindrical tube in the float. A plate 24 having a non-circular opening 25 on the float conforms to the twisted portion of the shaft so that the float can impart turning movement to the shaft through the angular range of the gauge hand. The float is shown as being constrained to rise and fall in the casing without rotation by a guide rod 25 conveniently welded to one side of the casing and coacting with a longitudinal groove or depression 26 in the side of the float. The float is preferably cylindrical and is only slightly smaller than the casing so that it will not be disengaged from the guide rod.

It is sometimes necessary to remove the float gauge and its operating means for repairs and/or replacement. In liquefied gas dispensing systems, it is highly desirable to maintain continuous service when the gauge and its parts are removed. To prevent gas in the tank from escaping, the tubular casing is shown as having valves which close automatically when the gauge housing is disconnected from the fitting and which are normally open to permit the liquefied gas in the tank to establish its level within the tubular casing and operate the float. Herein, the lower end of the casing has a closure plug 27 with an opening 28 controlled by a check valve 29 opening downwardly into the tank normally to permit liquid to flow into the casing and find its level. Above the maximum liquid level, the casing is shown as having a vapor or gas opening 30 controlled by a vapor check valve 31 having a stem 32 and held loosely in place by a pin 33, the arrangement being such that the valve will open by gravity to permit the gas pressures in the tank and casing to be equalized. In this instance, this vapor check valve is near the top of the casing to afford easy access to it for installation and repairs. It will be understood that other suitable forms of check valves may be used in the casing.

When it becomes necessary to remove the float and the gauge operating shaft for inspection or repairs, the float is adapted to be lifted out of the fitting with the gauge housing and shaft. For this purpose, the lower end of the shaft carries a cross pin 34 to engage the lower end of the float and prevent it from being disengaged from the shaft. Incidentally, the groove or depression 26 in the float will straddle the inwardly projecting stem 32 of the valve 31 and permit the float to pass by it. When these parts are removed the operating shaft may be separated from its bearing by tilting the gauge housing relative to the shaft. Also, the float is limited in its upward movement on the shaft by a cross pin 35 on the shaft. This arrangement also prevents the float from being disengaged from the twisted portion of the shaft during shipment of the assembled gauge unit and casing.

It will be understood that when the gauge is removed and replaced, the check valves will permit a slight leakage of gas into the casing to equalize the pressure in the casing with that in the tank. Then, both check valves will open and the liquid will establish its level in the casing. However, such slight leaks caused by ordinary unground or hair-scratched valve parts will not permit any appreciable quantity of gas to escape to the atmosphere.

From the foregoing it will be seen that the float gauge unit may be completely assembled on the fitting at the factory and shipped with other filling and dispensing equipment to be applied to a tank when installed. The casing protects the float and the gauge operating mechanism during shipment. Moreover, the unit may be quickly applied to a tank and is easily removed. The standpipe may project above the ground level in underground systems so that the gauge may be read without opening a protecting casing. Such units are applicable to many different types of systems and will insure continuous gas service while they are removed for repairs or replacement.

Obviously, the present invention is not restricted to the particular embodiment thereof herein shown and described. Moreover, it is not indispensable that all the features of the invention be used conjointly, since they may be employed advantageously in various combinations and sub-combinations.

What is claimed is:

1. In combination with a storage tank for liquefied petroleum gas under pressure, a liquid level gauge and operating means therefor removably connected as a unit to the tank; a tubular casing for the operating means projecting into the tank; and check valves in the casing above and below the maximum liquid level in the tank to prevent the contents of the tank from escaping to the atmosphere when the gauge is removed.

2. In combination with a storage tank for liquefied petroleum gas under pressure, a standpipe on the tank; a fitting secured to the top of the standpipe; a liquid level gauge having a housing removably secured to the fitting; a valved tubular casing secured to and projecting from the fitting through the standpipe into the bottom portion of the tank; a gauge operating shaft having a bearing carried by the gauge housing; and a float confined within said tubular casing connected to impart gauge operating movement to said shaft, said shaft and float being removable from the casing through said fitting.

3. In combination with a storage tank for liquefied petroleum gas under pressure, a standpipe on the tank; a fitting secured to the top of the standpipe; a liquid level gauge having a housing removably secured to the fitting; a tubular casing projecting from the fitting into the bottom portion of the tank; a gauge operating shaft having a bearing carried by the gauge housing; a float within the casing having means to impart turning movement to said shaft; and check valves in the casing opening outwardly therefrom into the tank, one above the maximum liquid level and one at the bottom of the casing.

4. In combination with a storage tank for liquids, a fitting; a gauge housing carried by said fitting and having a pivoted gauge hand; a depending valved casing carried by said fitting below the housing and extending to the bottom portion of the tank; a supporting bearing carried by the housing; a rotatable gauge rod suspended from the bearing and carrying a magnet to operate said hand; and float means within the casing cooperating with the shaft to rotate the same as the float rises and falls in the casing, said float and gauge rod being removable from the casing with said gauge housing and said casing communicating with the interior of the tank through its valves near the bottom and above the maximum liquid level.

5. In combination with a storage tank for liquids under pressure, a fitting; a gauge housing carried by said fitting and having a pivoted gauge hand; a depending casing carried by said fitting below the housing and extending to the bottom portion of the tank; a supporting bearing carried by the housing; a rotatable gauge rod suspended from the bearing and carrying a magnet to operate said hand; float means within the casing cooperating with the shaft to rotate the same as the float rises and falls in the casing; a check valve in the casing above the maximum liquid level; and a check valve at the bottom portion of the casing, both of said valves opening outwardly from the casing into the tank.

6. As an article of manufacture, a fitting; a liquid level gauge removably secured to the fitting; float operating means for the gauge; and a valved tubular casing for the float operating means, all assembled as a unit and adapted to be secured to a tank or receptacle.

7. As an article of manufacture, a liquid level gauge having a housing; a vertical casing below said housing having spaced check valves; a supporting bearing carried by the housing; a rotatable gauge rod removably suspended from the bearing within the casing; and float means within the casing cooperating with the shaft to cause rotation of the same as the float rises and falls in the casing.

8. As an article of manufacture, a liquid level gauge assembly including a fitting adapted to be secured to a standpipe on a tank; a gauge having a housing removably secured to the fitting; a tubular casing depending from the fitting; a spirally twisted gauge operating shaft within the casing and removable from the fitting with the gauge; a float confined within the casing and connected to turn the shaft; stop means on the shaft for the float; and check valves on the casing to permit liquid in a tank to establish its level within the casing and arranged to close when the gauge is removed.

LOYD J. WHITE.